United States Patent
Lee et al.

(10) Patent No.: US 7,715,325 B2
(45) Date of Patent: May 11, 2010

(54) HOME NETWORK SYSTEM

(75) Inventors: Koon-Seok Lee, Changwon-shi (KR);
Feel-Young Koo, Busan (KR); Yong-Tae Kim, Gimhae-shi (KR); Hwan-Jong Choi, Busan (KR); Seung-Myun Baek, Changwon-shi (KR); Ja-In Koo, Jinhu-shi (KR); Seong-Hwan Kang, Kyungsangnam-do (KR)

(73) Assignee: LG Electronics Inc, Seoul (KR)

( * ) Notice: Subject to any disclaimer, the term of this patent is extended or adjusted under 35 U.S.C. 154(b) by 715 days.

(21) Appl. No.: 10/558,436

(22) PCT Filed: Jul. 7, 2003

(86) PCT No.: PCT/KR03/01346
§ 371 (c)(1),
(2), (4) Date: Mar. 19, 2007

(87) PCT Pub. No.: WO2004/107660
PCT Pub. Date: Dec. 9, 2004

(65) Prior Publication Data
US 2007/0255796 A1 Nov. 1, 2007

(30) Foreign Application Priority Data
May 30, 2003 (KR) ...................... 10-2003-0034962

(51) Int. Cl.
*H04L 12/28* (2006.01)
(52) U.S. Cl. ........................................ 370/254; 370/252
(58) Field of Classification Search .................. 710/109, 710/104, 113, 300–304, 8–14; 709/710, 709/221, 245, 209, 220, 223, 224; 370/400, 370/252, 254, 473
See application file for complete search history.

(56) References Cited

U.S. PATENT DOCUMENTS 4,888,728 A 12/1989 Shirakawa et al.

(Continued)

FOREIGN PATENT DOCUMENTS

EP 1 115 263 7/2001

(Continued)

OTHER PUBLICATIONS

Kim, S., et al., Home Networking Digital TV Based on LnCP, Seoul, Korea, IEEE Transactions on Consumer Electronics, vol. 48, No. 4, Nov. 2002, pp. 990-996.

(Continued)

*Primary Examiner*—Ayaz R Sheikh
*Assistant Examiner*—Chuong T Ho
(74) *Attorney, Agent, or Firm*—McKenna Long & Aldridge LLP

(57) ABSTRACT

A home network system which can efficiently configure a new home appliance in the home network system. The home network system includes at least one new device newly connected to a master device through a network, for transmitting a plugged-in request message containing an initial address through the network, receiving an address change request message containing a logical address, and changing the initial address to the logical address, and at least one master device connected to the new device through the network, for receiving the plugged-in request message from the new device, setting the logical address for the new device, and transmitting the address change request message containing the logical address to the new device, wherein the initial address comprises at least a product code and a logical address of the new device, and the new device changes the logical address to the logical address set by the master device.

20 Claims, 14 Drawing Sheets

U.S. PATENT DOCUMENTS

| | | | |
|---|---|---|---|
| 4,980,913 A | 12/1990 | Skret | |
| 5,268,666 A | 12/1993 | Michel et al. | |
| 5,519,858 A | 5/1996 | Walton et al. | |
| 5,867,666 A | 2/1999 | Harvey | |
| 6,006,272 A | 12/1999 | Aravamudan et al. | |
| 6,160,808 A | 12/2000 | Maurya | |
| 6,233,248 B1 | 5/2001 | Sautter et al. | |
| 6,366,583 B2 | 4/2002 | Rowett et al. | |
| 6,415,313 B1 | 7/2002 | Yamada et al. | |
| 6,453,687 B2 | 9/2002 | Sharood et al. | |
| 6,507,953 B1 | 1/2003 | Horlander et al. | |
| 6,522,654 B1* | 2/2003 | Small | 370/400 |
| 6,618,764 B1 | 9/2003 | Shteyn | |
| 6,631,476 B1* | 10/2003 | Vandesteeg et al. | 714/4 |
| 6,701,198 B1* | 3/2004 | Vandesteeg et al. | 700/79 |
| 6,721,900 B1* | 4/2004 | Lenner et al. | 714/4 |
| 6,735,619 B1 | 5/2004 | Sawada | |
| 6,759,946 B2 | 7/2004 | Sahinoglu et al. | |
| 6,856,999 B2 | 2/2005 | Flanagin et al. | |
| 6,891,850 B1* | 5/2005 | Vandesteeg et al. | 370/466 |
| 6,915,444 B2* | 7/2005 | Vasko et al. | 714/4 |
| 6,982,960 B2 | 1/2006 | Lee et al. | |
| 6,987,462 B2 | 1/2006 | Bae et al. | |
| 7,028,312 B1 | 4/2006 | Merrick et al. | |
| 7,062,531 B2 | 6/2006 | Kim | |
| 7,069,091 B2 | 6/2006 | Williamson | |
| 7,103,834 B1 | 9/2006 | Humpleman et al. | |
| 7,107,358 B2* | 9/2006 | Vasko et al. | 709/249 |
| 7,111,100 B2* | 9/2006 | Ellerbrock | 710/300 |
| 7,149,792 B1 | 12/2006 | Hansen et al. | |
| 7,200,683 B1 | 4/2007 | Wang et al. | |
| 7,257,104 B2 | 8/2007 | Shitama | |
| 7,287,062 B2 | 10/2007 | Im et al. | |
| 7,308,644 B2* | 12/2007 | Humpleman et al. | 715/205 |
| 7,353,259 B1 | 4/2008 | Bakke et al. | |
| 7,389,332 B1 | 6/2008 | Muchow et al. | |
| 7,389,358 B1 | 6/2008 | Matthews et al. | |
| 7,412,538 B1 | 8/2008 | Eytchison et al. | |
| 7,421,478 B1 | 9/2008 | Muchow | |
| 7,430,591 B2* | 9/2008 | Chamberlain | 709/220 |
| 7,437,494 B2* | 10/2008 | Ellerbrock | 710/113 |
| 7,454,517 B2 | 11/2008 | Ha et al. | |
| 7,461,164 B2 | 12/2008 | Edwards et al. | |
| 2002/0011923 A1 | 1/2002 | Cunningham et al. | |
| 2002/0038358 A1 | 3/2002 | Sweatt, III et al. | |
| 2002/0059617 A1 | 5/2002 | Terakado et al. | |
| 2002/0072356 A1 | 6/2002 | Yamashita et al. | |
| 2002/0103898 A1 | 8/2002 | Moyer et al. | |
| 2003/0009537 A1 | 1/2003 | Wang | |
| 2003/0014630 A1 | 1/2003 | Spencer et al. | |
| 2003/0038730 A1 | 2/2003 | Imafuku et al. | |
| 2003/0051053 A1* | 3/2003 | Vasko et al. | 709/246 |
| 2003/0051203 A1* | 3/2003 | Vasko et al. | 714/781 |
| 2003/0065824 A1 | 4/2003 | Kudo | |
| 2003/0079000 A1 | 4/2003 | Chamberlain | |
| 2003/0083758 A1 | 5/2003 | Williamson | |
| 2003/0085795 A1 | 5/2003 | An | |
| 2003/0088703 A1 | 5/2003 | Kim | |
| 2004/0111490 A1 | 6/2004 | Im et al. | |
| 2004/0158333 A1 | 8/2004 | Ha et al. | |
| 2005/0190727 A1 | 9/2005 | Vanlieshout et al. | |
| 2006/0271709 A1* | 11/2006 | Vasko et al. | 709/249 |
| 2007/0019615 A1 | 1/2007 | Baek et al. | |
| 2007/0025368 A1 | 2/2007 | Ha et al. | |
| 2008/0097631 A1* | 4/2008 | Baek et al. | 700/90 |
| 2008/0255692 A1 | 10/2008 | Hofrichter et al. | |

FOREIGN PATENT DOCUMENTS

| | | | |
|---|---|---|---|
| WO | WO-0297555 | * | 5/2002 |
| WO | WO 02/097555 | | 12/2002 |

OTHER PUBLICATIONS

Lee, K.S., et al., A New Control Protocol for Home Appliances—LnCP, Digital Appliance Research Lab., Pusan, Korea, IEEE, 2001, pp. 286-291.

Baatz, et al., "Handoff Support for Mobility with IP over Bluetooth," Univ. of Bonn, Inst. of Comp Sci. IV (2000 IEEEE), p. 143-154.

Wang et al., "Towards Dependable Home Networking: An Experience Report", IEEE, 2000, p. 43-48.

Lee et al., "A New Home Network Protocol for Controlling and Monitoring Home Appliances-HNCP", IEEE, 2002, p. 312-313.

Mintae Hwang, et al., "ATM-based Plug-and-play Technique for In-home Networking", Electronics Letters, vol. 34, Issue 22, Oct. 29, 1998, IEE Stevenage, GB, pp. 2088-2090.

Jukka Manner, et al., "Evaluation of Mobility and Quality of Service Interaction", Computer Networks, vol. 38, Issue 2, Feb. 5, 2002, Elsevier Science Publishers B.V., Amsterdam, NL, pp. 137-163.

"Introduction and Technology Trend of Home Network," Samsung SDS It Review, Jan. 2002 (Korean and English translation).

Lee et al., "A New Control Protocol for Home Appliances", IEEE, 2001, pp. 286-291.

* cited by examiner

| FIXED CODE (8 BIT) | LOGICAL ADDRESS (8 BIT) |
|---|---|
| PRODUCT CODE | DEVICE CODE |
| | AREA CODE |

FIG.4C

| PRODUCT NAME | PRODUCT CODE | ADDRESS RANGE |
|---|---|---|
| MASTER DEVICE(NETWORK MANAGER) | 0x00 | 0x0000 ~ 0x00FE |
| REFRIGERATOR | 0x01 | 0x0100 ~ 0x01FE |
| AIR CONDITIONER | 0x02 | 0x0200 ~ 0x02FE |
| MICROWAVE OVEN | 0x03 | 0x0300 ~ 0x03FE |
| ⋮ | ⋮ | ⋮ |

FIG.7

| RECEIVER | TRANSMITTER | . . | COMMAND CODE | ARGUMENT | |
|---|---|---|---|---|---|
| 0x0200 | 0x0000 | . . | 0x0E | 0x01 | 0xFE |

FIG.8A

| RECEIVER | TRANSMITTER | . . | COMMAND CODE | ARGUMENT |
|---|---|---|---|---|
| 0x0000 | 0x0200 | . . | 0x0E | 0x0A |

FIG.8B

| RECEIVER | TRANSMITTER | . . | COMMAND CODE | ARGUMENT |
|---|---|---|---|---|
| 0x0000 | 0x0200 | . . | 0x0E | 0x05 |

FIG.8C

| RECEIVER | TRANSMITTER | . . | COMMAND CODE | ARGUMENT |
|---|---|---|---|---|
| 0x0000 | 0x0200 | . . | 0x0E | 0x03 |

FIG.8D

| RECEIVER | TRANSMITTER | . . | COMMAND CODE | ARGUMENT |
|---|---|---|---|---|
| 0x0000 | 0x0200 | . . | 0x0E | 0x05 |

FIG.9A

| RECEIVER | TRANSMITTER | .. | COMMAND CODE | ARGUMENT | |
|---|---|---|---|---|---|
| 0x0202 | 0x0000 | .. | 0x0F | 0x01 | 0x00 |

FIG.9B

| RECEIVER | TRANSMITTER | .. | COMMAND CODE | ARGUMENT | |
|---|---|---|---|---|---|
| 0x020A | 0x0000 | .. | 0x0F | 0x02 | 0x00 |

FIG.10

| RECEIVER | TRANSMITTER | .. | COMMAND CODE | ARGUMENT | |
|---|---|---|---|---|---|
| 0x0205 | 0x0000 | .. | 0x0E | 0x03 | 0xFE |

FIG.11A

| RECEIVER | TRANSMITTER | .. | COMMAND CODE | ARGUMENT |
|---|---|---|---|---|
| 0x0000 | 0x0205 | .. | 0x0E | 0x1D |

FIG.11B

| RECEIVER | TRANSMITTER | .. | COMMAND CODE | ARGUMENT |
|---|---|---|---|---|
| 0x0000 | 0x0205 | .. | 0x0E | 0xF1 |

FIG.12A

| RECEIVER | TRANSMITTER | .. | COMMAND CODE | ARGUMENT | |
|---|---|---|---|---|---|
| 0x021D | 0x0000 | .. | 0x0F | 0x03 | 0x00 |

FIG.12B

| RECEIVER | TRANSMITTER | .. | COMMAND CODE | ARGUMENT | |
|---|---|---|---|---|---|
| 0x02F1 | 0x0000 | .. | 0x0F | 0x04 | 0x00 |

FIG.13

| PRODUCT NAME | ADDRESS | AREA (AREA CODE) | STATUS |
|---|---|---|---|
| MASTER DEVICE (NETWORK MANAGER) | 0x0000 | LIVING ROOM(0x01) | OPERATION |
| REFRIGERATOR | 0x0101 | KITCHEN(0x02) | OPERATION |
| AIR CONDITIONER 1 | 0x0202 | LIVING ROOM(0x01) | OPERATION |
| AIR CONDITIONER 2 | 0x0203 | ROOM 1(0x03) | STOP |
| AIR CONDITIONER 3 | 0x0201 | ROOM 2(0x04) | STOP |
| AIR CONDITIONER 4 | 0x0204 | ROOM 3(0x05) | OPERATION |
| MICROWAVE OVEN | 0x0301 | KITCHEN(0x02) | STOP |

HOME NETWORK SYSTEM

This application claims the benefit of International Application No. PCT/KR2003/001346, filed on Jul. 7, 2003 and Korean Application No. 2003-0034962, filed on May 30, 2003, which is hereby incorporated by reference as if fully set forth herein.

TECHNICAL FIELD

The present invention relates to a home network system, and more particularly to, a home network system which can efficiently configure a new home appliance in the existing home network system.

BACKGROUND ART

Home automation for automatically controlling home appliances at home or remotely has almost reached a commercial use stage. At its early stage, the home automation separately controlled each home appliance by using a telephone or infrared rays, and did not connect the home appliances one another. However, there has been suggested a method for building a network of home appliances by using a communication means, and collectively managing the network by using a controller.

FIG. 1 is a structure view illustrating a general home network system. Referring to FIG. 1, a home network connects various digital home appliances so that a user can always enjoy convenient, safe and economic life services inside or outside the house.

As factors of the advent of the home network, refrigerators or washing machines called white home appliances have been gradually digitalized due to development of digital signal processing techniques, and new information home appliances have been made due to rapid development of home appliance operating system techniques and high speed multimedia communication techniques.

Here, an IT network is built to exchange data between a personal computer and peripheral devices or provide Internet services, and an AV network is built between home appliances using audio or video information. In addition, a living network is built to simply control home appliances, such as home automation or remote meter reading, and may be comprised of a refrigerator, washing machine, microwave oven, electric lamp, gas alarm, air conditioner and telephone.

The home network system includes a master device which is a home appliance for controlling an operation of the other home appliances or monitoring a status thereof, and a slave device which is a home appliance having a function of responding to the request of the master device and a function of notifying a status change according to properties of the home appliances or other factors. Here, the home appliances (or new devices) include home appliances for the living network service such as a washing machine and a refrigerator as well as home appliances for the IT network service and the AV network service.

The conventional home network system has never suggested an apparatus and method for configuring a new home appliance as a new slave device (or master device). Especially, the conventional arts have not taught an apparatus and method for requiring only a simple operation to general users who are not familiar with complicated mechanism of the home network system, and enabling the home network system to automatically recognize and configure a new home appliance.

DISCLOSURE OF THE INVENTION

An object of the present invention is to provide a home network system which can efficiently configure a new home appliance when it is firstly configured in the existing home network system.

Another object of the present invention is to provide a home network system which can connect a new device to the existing home network system and automatically configure the new device at the same time, without requiring special operations to a user.

Yet another object of the present invention is to provide a home network system which can efficiently configure a plurality of new devices in the home network system at the same time.

In order to achieve the above-described objects of the invention, there is provided a home network system including: at least one new device newly connected to a master device through a network, for transmitting a plugged-in request message containing an initial address through the network, receiving an address change request message containing a logical address, and changing the initial address to the logical address; and at least one master device connected to the new device through the network, for receiving the plugged-in request message from the new device, setting the logical address for the new device, and transmitting the address change request message containing the logical address to the new device.

Preferably, the master device receives and stores product information of the new device.

Preferably, the master device sets an area code of the new device.

Preferably, the master device sets option values, and the options include an alive notification period.

Preferably, the master device updates a home network list by registering the new device, and the master device displays the updated home network list through a display.

Preferably, the new device transmits an address change ACK response message to the master device.

Preferably, the initial address includes at least a product code and a logical address of the new device, the new device changes the logical address to the logical address set by the master device, and the master device decides whether the logical address contained in the initial address of the new device is an initial logical address before setting the logical address, and sets the logical address when the logical address of the new device is identical to the initial logical address.

Preferably, when the master device receives a plurality of plugged-in request messages within a predetermined time, the master device decides whether the plugged-in request messages are inputted from the same product devices before setting the logical address, transmits join request messages containing temporary logical address ranges to the new devices when the messages are inputted from the same product devices, or transmits the join request messages containing the temporary logical address ranges respectively to the same product devices when the messages are inputted from different kinds of devices.

Preferably, the new device sets an arbitrary value as a temporary logical address within the temporary logical address range, changes the logical address to the temporary logical address, and transmits a join ACK response message containing the temporary logical address to the master device. The address change request message which the master device transmits to the new device contains the temporary logical address and the logical address set by the master device.

Preferably, the master device decides whether the temporary logical addresses contained in the join ACK response messages are identical, re-transmits join request messages containing new temporary logical address ranges to the new devices transmitting the same temporary logical addresses, and transmits address change request messages containing new logical addresses to the other new devices. Here, the new temporary logical addresses are not identical to the new logical addresses set in the other new devices.

Preferably, the master device further includes a volatile memory for storing the temporary logical addresses.

According to another aspect of the invention, a configuration method of a home network system including at least one master device and new device includes the steps of, transmitting, at the new device, a plugged-in request message containing an initial address of the new device to the master device; setting, at the master device, a logical address for the new device; transmitting, at the master device, an address change request message containing the logical address to the new device; and changing, at the new device, the initial address to the logical address.

Preferably, the configuration method further includes a step for receiving and storing, at the master device, product information of the new device.

Preferably, the configuration method further includes a step for setting, at the master device, an area code of the new device.

Preferably, the configuration method further includes a step for setting option values, and the options include an alive notification period.

Preferably, the configuration method further includes a step for updating a home network list by registering the new device, and the configuration method further includes a step for displaying the updated home network list through a display.

Preferably, the configuration method further includes a step for transmitting, at the new device, an address change ACK response message to the master device.

Preferably, the initial address includes at least a product code and a logical address of the new device, and the new device changes the logical address to the logical address set by the master device in the change step. In addition, the configuration method further includes a step for deciding, at the master device, whether the logical address contained in the initial address of the new device is an initial logical address before the step for setting the logical address, and performs the succeeding procedure of the setting step when the logical address of the new device is identical to the initial logical address.

Preferably, the configuration method further includes the steps of: when the master device receives a plurality of plugged-in request messages within a predetermined time, deciding, at the master device, whether the plugged-in request messages are inputted from the same product devices before the step for setting the logical address; when the messages are inputted from the same product devices, transmitting, at the master device, join request messages containing temporary logical address ranges to the new devices; or when the messages are inputted from different kinds of devices, transmitting, at the master device, the join request messages containing the temporary logical address ranges respectively to the same product devices.

Preferably, the configuration method further includes the steps of: setting, at the new device, an arbitrary value as a temporary logical address within the temporary logical address range; changing, at the new device, the logical address to the temporary logical address; and transmitting, at the new device, a join ACK response message containing the temporary logical address to the master device.

Preferably, the address change request message which the master device transmits to the new device contains the temporary logical address and the logical address set by the master device.

Preferably, the configuration method further includes the steps of: deciding, at the master device, whether the temporary logical addresses contained in the join ACK response messages are identical; re-transmitting, at the master device, join request messages containing new temporary logical address ranges to the new devices transmitting the same temporary logical addresses; and transmitting, at the master device, address change request messages containing new logical addresses to the other new devices. Here, the new temporary logical addresses are not identical to the new logical addresses set in the other new devices.

According to another aspect of the invention, a configuration apparatus for configuring a new device in a home network system includes: an interface means connected to the home network system through a network; a memory for storing an initial address; and a control means for transmitting a plugged-in request message containing the initial address through the interface means when the interface means is connected to the home network system, receiving an address change request message from the home network system, changing the initial address to a logical address set by the home network system and contained in the address change request message, and storing the logical address in the memory.

According to another aspect of the invention, a configuration method for configuring a new device in a home network system includes the steps of: transmitting, at a new device, a plugged-in request message containing an initial address of the new device to the home network system; receiving an address change request message from the home network system; and changing the initial address to a logical address contained in the address change request message.

According to another aspect of the invention, a program storage medium stores a computer-readable program which is provided to a new device configured in a home network system and which includes the steps of: transmitting, at a new device, a plugged-in request message containing an initial address of the new device to the home network system; receiving an address change request message from the home network system; and changing the initial address to a logical address contained in the address change request message.

According to another aspect of the invention, a configuration apparatus for configuring a new device in a home network system includes: an interface means connected to the home network system through a network; a memory for storing logical addresses within a predetermined range; and a control means for receiving a plugged-in request message from the new device through the interface means, reading the logical address from the memory, setting a logical address for the new device, and transmitting an address change request message containing the logical address to the new device.

According to another aspect of the invention, a configuration method for configuring a new device in a home network system includes the steps of: receiving a plugged-in request message from the new device; setting a logical address for the new device from the previously-stored logical addresses; and transmitting an address change request message containing the logical address to the new device.

According to another aspect of the invention, a program storage medium stores a computer-readable program which is provided to a home network system in which a new device is configured, and which includes the steps of: receiving a plugged-in request message from the new device; setting a logical address for the new device from the previously-stored logical addresses; and transmitting an address change request message containing the logical address to the new device.

BRIEF DESCRIPTION OF THE DRAWINGS

FIGS. 4A to 4C are structure views illustrating address systems used in the home network system in accordance with the present invention;

FIGS. 7 to 12B are structure views illustrating messages transmitted in the third example of the configuration method in accordance with the present invention; and FIG. 13 is a table showing one example of a home network list.

BEST MODE FOR CARRYING OUT THE INVENTION

A home network system in accordance with the present invention will now be described in detail with reference to the accompanying drawings.

Figure 1:
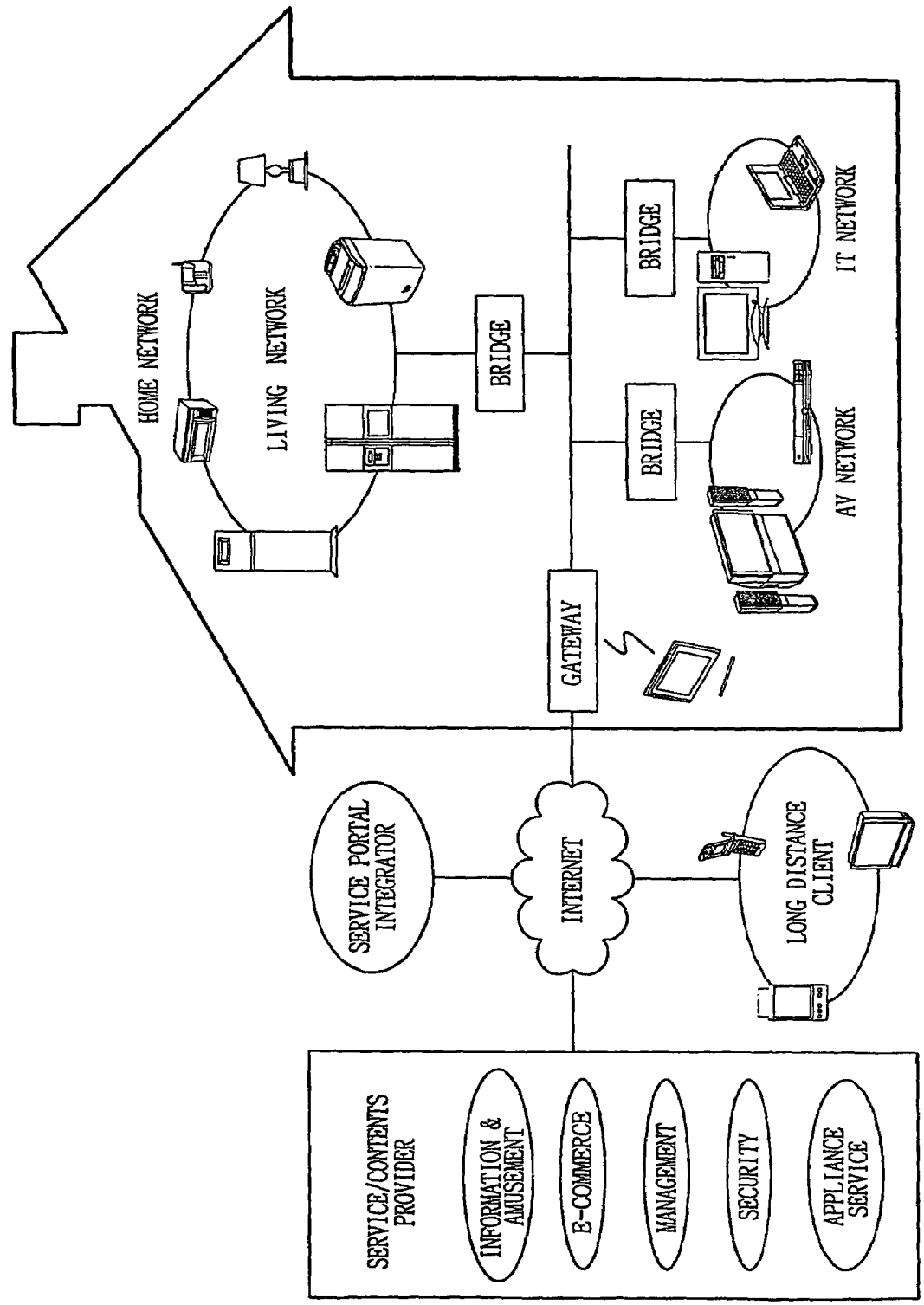
FIG. 1 is a structure view illustrating a general home network system.
Figure 2:
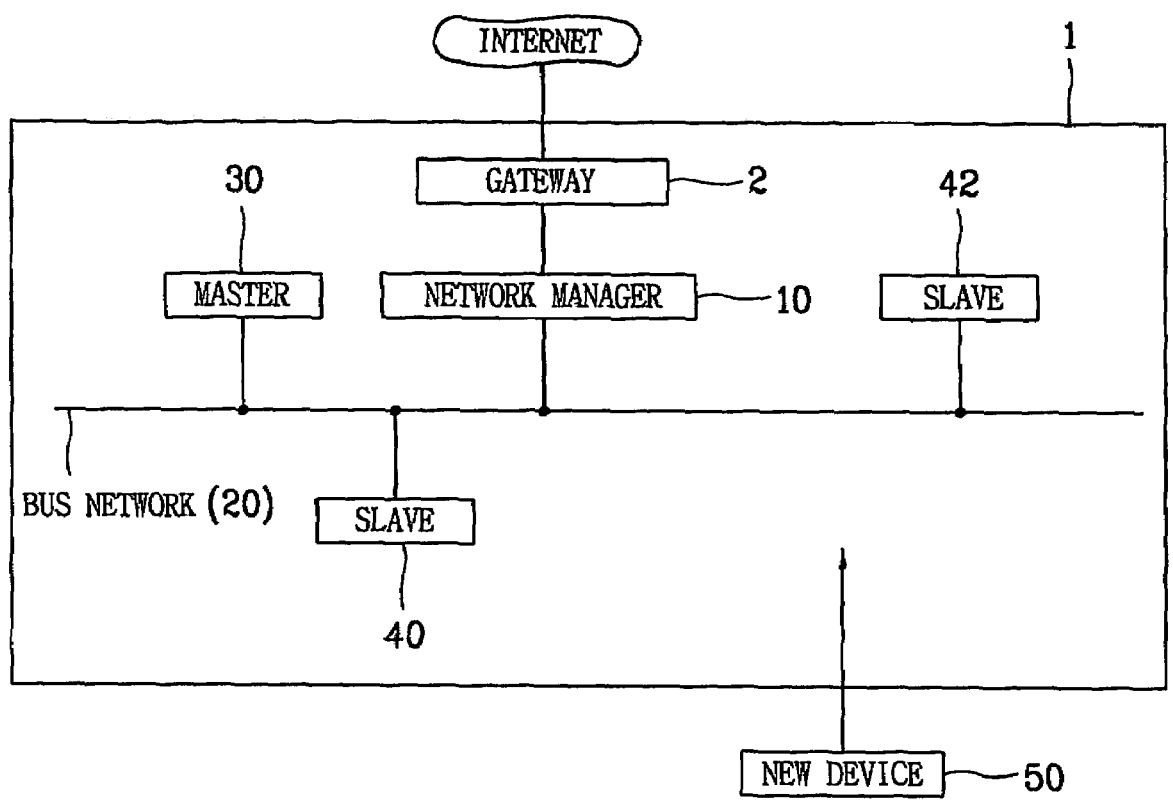
FIG. 2 is a status view illustrating configuration of a new device in a home network system in accordance with the present invention.

FIG. 2 is a status view illustrating configuration of a new device in the home network system in accordance with the present invention. Referring to FIG. 2, the home network system 1 includes at least one master device 30 and slave devices 40 and 42 connected through a bus network 20. In addition, the home network system 1 further includes a gateway 2 for access to an external Internet, and a network manager 10 connected to the gateway 2, for providing an Internet service and performing environment setting and resetting functions of home appliances of the home network system 1. FIG. 2 shows a process for registering and configuring the new device 50 in the home network system 1.

Here, the master device 30 performs the same functions as the general master device, and the network manager 10 performs similar functions to the master device 30 except for the Internet service. For conveniences' shake, there are presumed that the network manager 10 performs functions such as a bridge for the Internet service, and that only one master device 30 exists in the home network system 1.

The bus network 20 can be a wire medium such as a specially-installed line, or a previously-installed power line or telephone line, or a wireless transmission medium. However, still referring to FIG. 2, the home network system 1 composes a closed network for connecting home appliances of one house through a wire or wireless transmission medium. At this time, the closed network includes a physically-connected but logically-divided network.

Figure 3A:
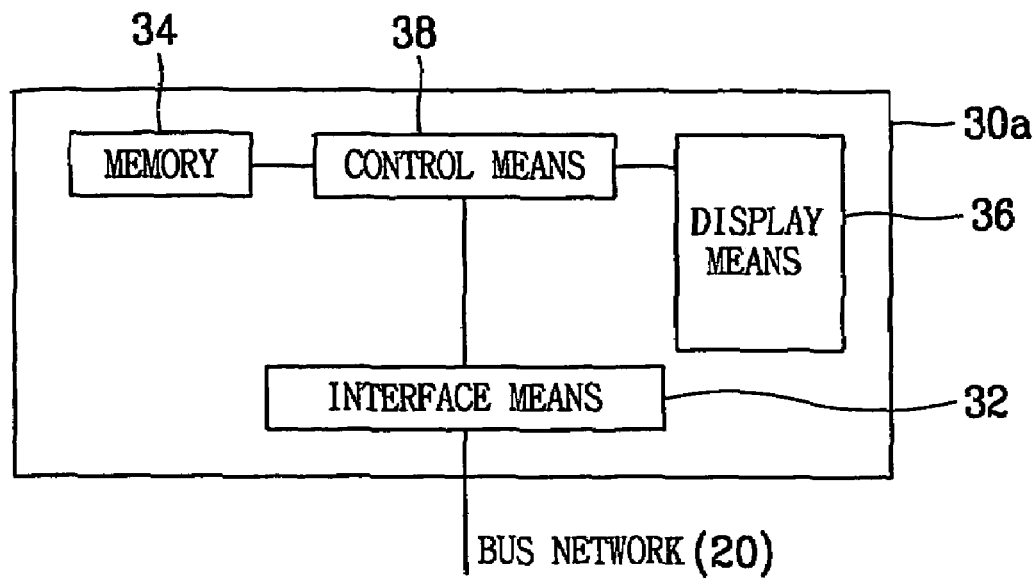
FIG. 3A is a structure view illustrating a configuration apparatus installed in a master device of FIG. 2.

FIG. 3A is a structure view illustrating a configuration apparatus installed in the master device of FIG. 2. As shown in FIG. 3A, the master device 30 includes the configuration apparatus 30a comprised of an interface means 32 for access to the bus network 20, a memory 34 for storing product information and product address information of the slave devices 40 and 42, a display means 36 for displaying information to the user, and a control means 38 for registering and configuring the new device 50 in the home network system 1 by controlling the interface means 32, the memory 34 and the display means 36.

The network manager 10 further includes an interface means (not shown) for access to the gateway 2.

Here, when the information of the slave devices 40 and 42 stored in the memory 34 includes functional properties and performance of each product, it also includes addresses for distinguishing the devices in the home network system 1, which will later be explained.

Figure 3B:
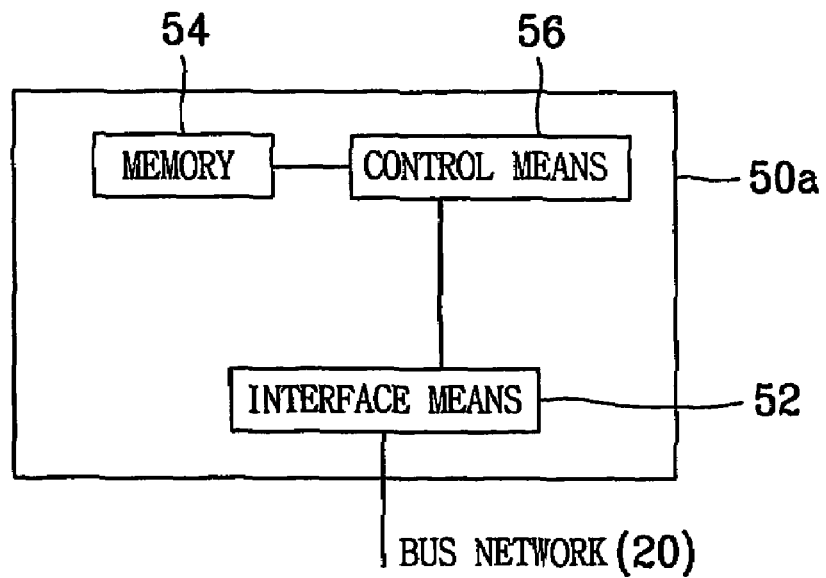
FIG. 3B is a structure view illustrating a configuration apparatus installed in the new device of FIG. 2.

FIG. 3B is a structure view illustrating a configuration apparatus installed in the new device of FIG. 2. As illustrated in FIG. 3B, the new device 50 includes the configuration apparatus 50a comprised of an interface means 52 for access to the bus network 20, a memory 54 for storing product information and initial address information of the new device 50, and a control means 56 for registering and configuring the new device 50 in the home network system 1 by controlling the interface means 52 and the memory 54.

Figures 4A, 4B:
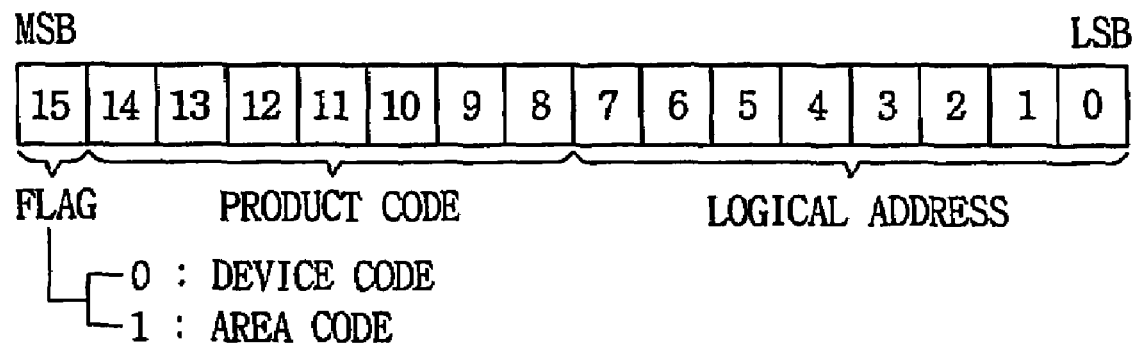

FIGS. 4A to 4C are structure views illustrating address systems used in the home network system in accordance with the present invention.

FIG. 4A shows a structure of an address field used in the home network system 1. As depicted in FIG. 4A, a product code is a unique value for distinguishing a basic function of a product, and a non-changeable physical address assigned to the product in shipment. Same kind of products have the same fixed address. A device code is a logical address used for distinguishing the products having the same product code. An area code is a logical address assigned according to the installed area at home.

FIG. 4B shows a detailed structure of the address field of FIG. 4A. As shown in FIG. 4B, MSB of the fixed address field is used as a flag, '0' implies the device code and '1' implies the area code. Therefore, the usage of logical address for the device code and the area code can be switched by setting the value of MSB in the whole address fields. In addition, when all bits in each sub-field are set to '1', a group address is assigned. For example, when a product code of a refrigerator is '0x01', '0x01FF' indicates a group address of refrigerators, and '0x81XX (X is an unspecific number)' indicates a group address of refrigerators having the same area code.

The device code can be automatically set in each slave device by the master device 30, and the area code can be automatically set by the master device 30. However, the area code are mostly set by the user due to technical problems. Here, the logical code implies the device code. The area code is additionally used in special cases.

FIG. 4C shows examples of product codes and address ranges of each product. In the address ranges, '0xXX00' implies initial logical addresses of each product, '0xXXFF' implies group addresses of each product as described above, and '0xXX01~0xXXFE' are logical addresses assigned to each master device and slave device in the home network system 1.

The product codes and the initial logical addresses are contained and stored in initial addresses of the memory of the configuration apparatus 50a in shipment. In addition, the product codes and address ranges of each product are stored in the memory of the configuration apparatus 30a, and the logical addresses of each address range are assigned to devices newly connected to the home network system by the control means 38.

Figure 5A:
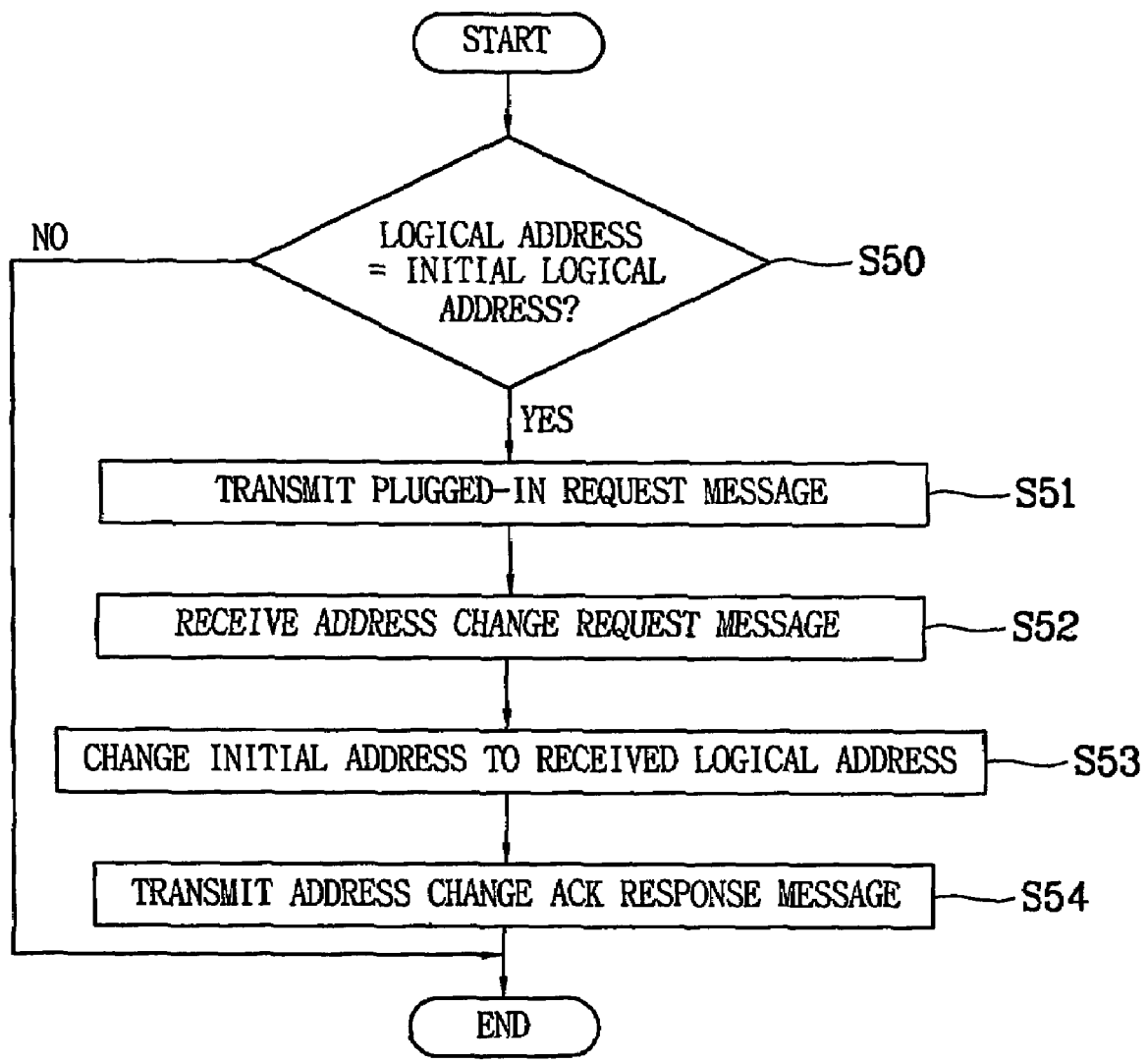
FIG. 5A is a flowchart showing a first example of a configuration method embodied in the new device of FIG. 2.

FIG. 5A is a flowchart showing a first example of a configuration method embodied in the new device of FIG. 2.

The configuration method includes a step (S50) for deciding, at the new device 50 connected to the home network system 1 and turned on, whether a previously-stored logical address is an initial logical address, a step (S51) for transmitting a plugged-in request message according to the decision result, a step (S52) for receiving an address change request message from the home network system 1, a step (S53) for changing an initial address to a received logical address, and a step (S54) for transmitting an address change ACK response message to the home network system 1.

In detail, in S50, the control means 56 decides whether the logical address of the initial address stored in the memory 54 is the initial logical address (0x00). When the stored logical address is the initial logical address, the control means 56 decides that the new device 50 has not been registered and configured in the home network system 1, and transmits the plugged-in request message. If the stored logical address is not the initial logical address, it implies that the new device 50 has already been registered and configured in the home network system 1, and thus the control means 56 needs not to transmit the plugged-in request message.

In S51, the control means 56 of the configuration apparatus 50a transmits the plugged-in request message containing the initial address (product code and logical address) stored in the memory 54 to the home network system 1 through the bus network 20 by the interface means 52. In addition, the control means 56 can transmit the plugged-in request message at an interval of a predetermined time.

In S52, the control means 56 receives the address change request message containing the new logical address for the new device 50 from the home network system 1 (specifically, configuration apparatus 30a of the master device 30) by the interface means 52.

In S53, the control means 56 changes the initial logical address of the initial address previously stored in the memory 54 to the new logical address, and stores the new logical address.

In S54, the control means 56 transmits the address change ACK response message containing the stored logical address to the home network system 1 by the interface means 52, and then ends the process for registering and configuring the new device 50 in the home network system 1.

Figure 5B:
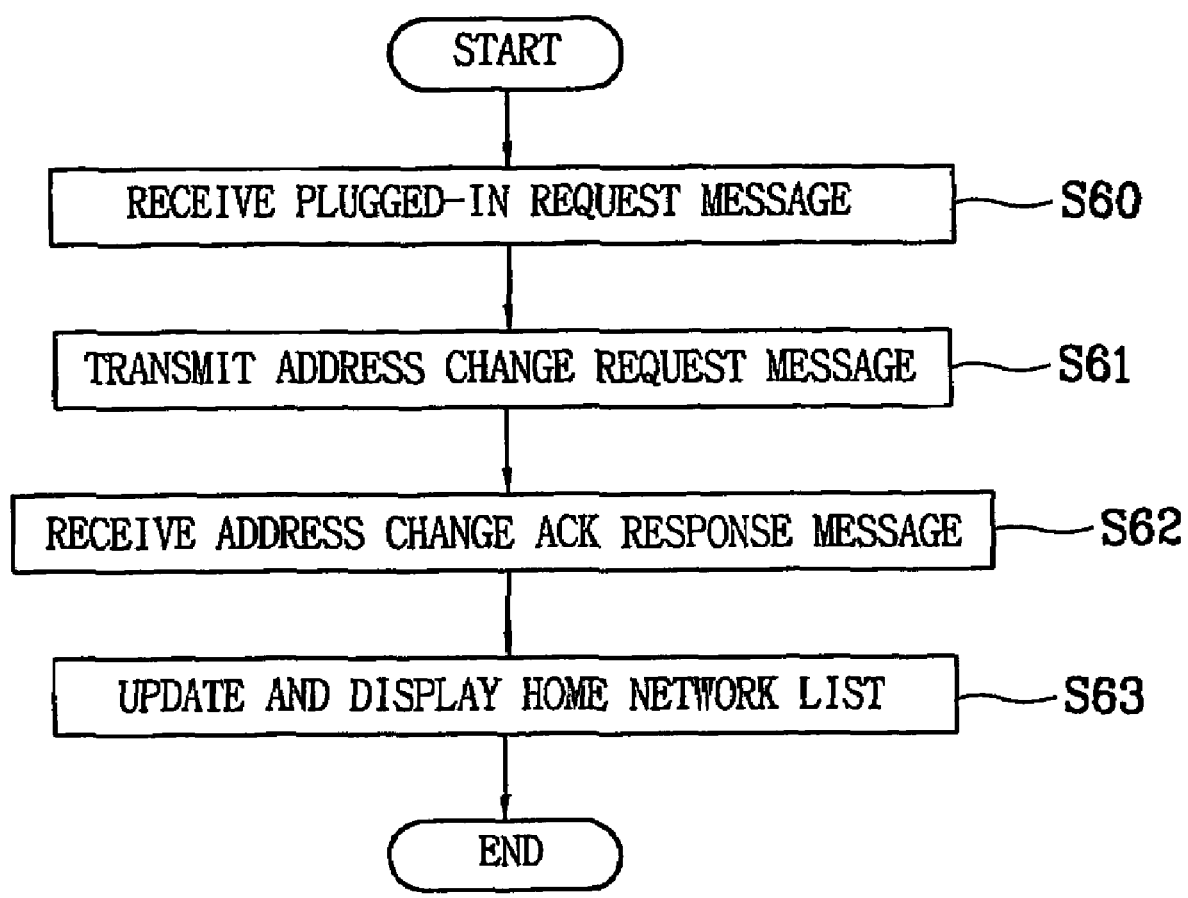
FIG. 5B is a flowchart showing a first example of a configuration method embodied in the master device of FIG. 2.

FIG. 5B is a flowchart showing a first example of a configuration method embodied in the master device of FIG. 2.

The configuration method includes a step (S60) for receiving, at the master device 30 of the home network system 1, a plugged-in request message from the new device 50, a step (S61) for transmitting an address change request message to the new device 50, a step (S62) for receiving an address change ACK response message from the new device 50, and a step (S63) for updating and displaying a home network list.

In detail, in S60, the control means 38 of the configuration apparatus 30a receives the plugged-in request message from the configuration apparatus 50a of the new device 50 by the interface means 32.

In S61, the control means 38 sets and stores the new logical address (empty logical address in which a product has not been set) for the product corresponding to the initial address contained in the plugged-in request message according to the information stored in the memory 34, and transmits the address change request message containing the new logical address to the new device 50 through the interface means 52. For example, when four air conditioners are installed and set in '0x0201' to '0x0204', if '0x0202' is deleted, '0x0201', '0x0203' and '0x0204' remain in the home network system 1, and a newly-added air conditioner is set in '0x0202'.

In S62, the control means 38 receives the address change ACK response message containing the new logical address from the new device 50, and confirms that the logical address setting of the new device 50 is finished.

In S63, the control means 38 updates the home network list containing information of the devices of the home network system 1 by registering information of the new device 50. The user can confirm the updated home network list through the display means 36. Here, the home network list includes data made to display the information of devices registered in the home network system 1 through the display means 36.

The configuration method further includes a step for receiving, at the master device 30, product information of the new device 50 from the new device 50, and storing the information in the memory 34.

The configuration method further includes a step which an area code of the new device 50 are automatically inputted by the master device 30 or manually by the user.

The configuration method further includes a step for changing option values for executing a predetermined operation between the master device 30 and the new device 50. The options can include an alive notification period in which the new device 50 transmits an alive event message to the master device 30. The master device 30 can change the alive notification period according to a communication status of the home network 1.

Figure 6A:
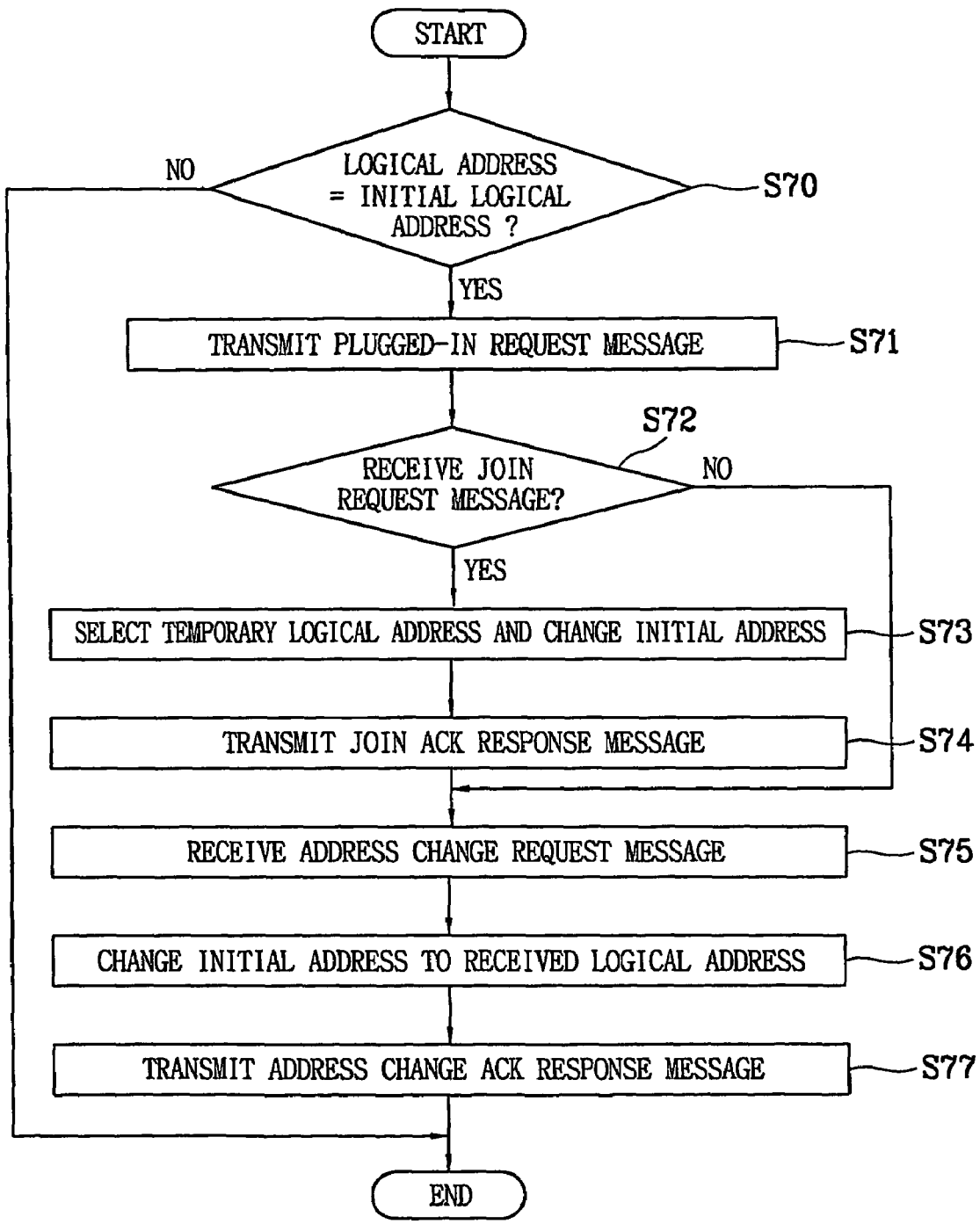
FIG. 6A is a flowchart showing a second example of the configuration method embodied in the new device of FIG. 2.

FIG. 6A is a flowchart showing a second example of the configuration method embodied in the new device of FIG. 2.

The configuration method includes a step (S70) for deciding, the new device 50 connected to the home network system 1 and turned on, whether a previously-stored logical address is an initial logical address, a step (S71) for transmitting a plugged-in request message according to the decision result, a step (S72) for deciding whether a join request message is inputted from the home network system 1, a step (S73) for selecting a temporary logical address and changing an initial address to the temporary logical address according to the decision result, a step (S74) for transmitting a join ACK response message to the home network system 1, a step (S75) for receiving an address change request message from the home network system 1, a step (S76) for changing the initial address to a received logical address, and a step (S77) for transmitting an address change ACK response message to the home network system 1.

In detail, S70 and S71 are identical to S50 and S51 of FIG. 5A.

In S72, the control means 56 decides whether the join request message is inputted through the interface means 52. The join request message contains the initial address of the new device 50 (for example, 0x0200) as well as a predetermined temporary logical address range (for example, 0x04~0xFE).

If the join request message is inputted in S72, in S73, the control means 56 selects a specific value as a temporary logical address within the temporary logical address range (for example, 0x08), changes the initial logical address of the initial address (0x00) to the temporary logical address, and stores the changed address in the memory 54. Generation of the join request message will be explained with reference to FIGS. 6B and 6C. If the join request message is not inputted, the procedure of FIG. 5A (S52~S54) is performed. The following steps S75~S77 are performed when the join request message is inputted.

In S74, the control means 56 transmits the join ACK response message containing the stored temporary logical address to the home network system 1 through the interface means 52.

In S75, the control means 56 receives the address change request message containing the product code, temporary logical address and new logical address from the home network system 1. The address change request message does not contain the initial logical address but the temporary logical address differently from the address change request message of FIG. 5A, and thus is regarded as a message relating to the new device 50.

In S76, the control means 56 changes the temporary logical address of the initial address previously stored in the memory 54 to the received logical address, and stores the changed address.

In S77, the control means 56 transmits the address change ACK response message containing the product code and logical address stored in the memory 54 to the home network system 1 through the interface means 52.

Figure 6B:
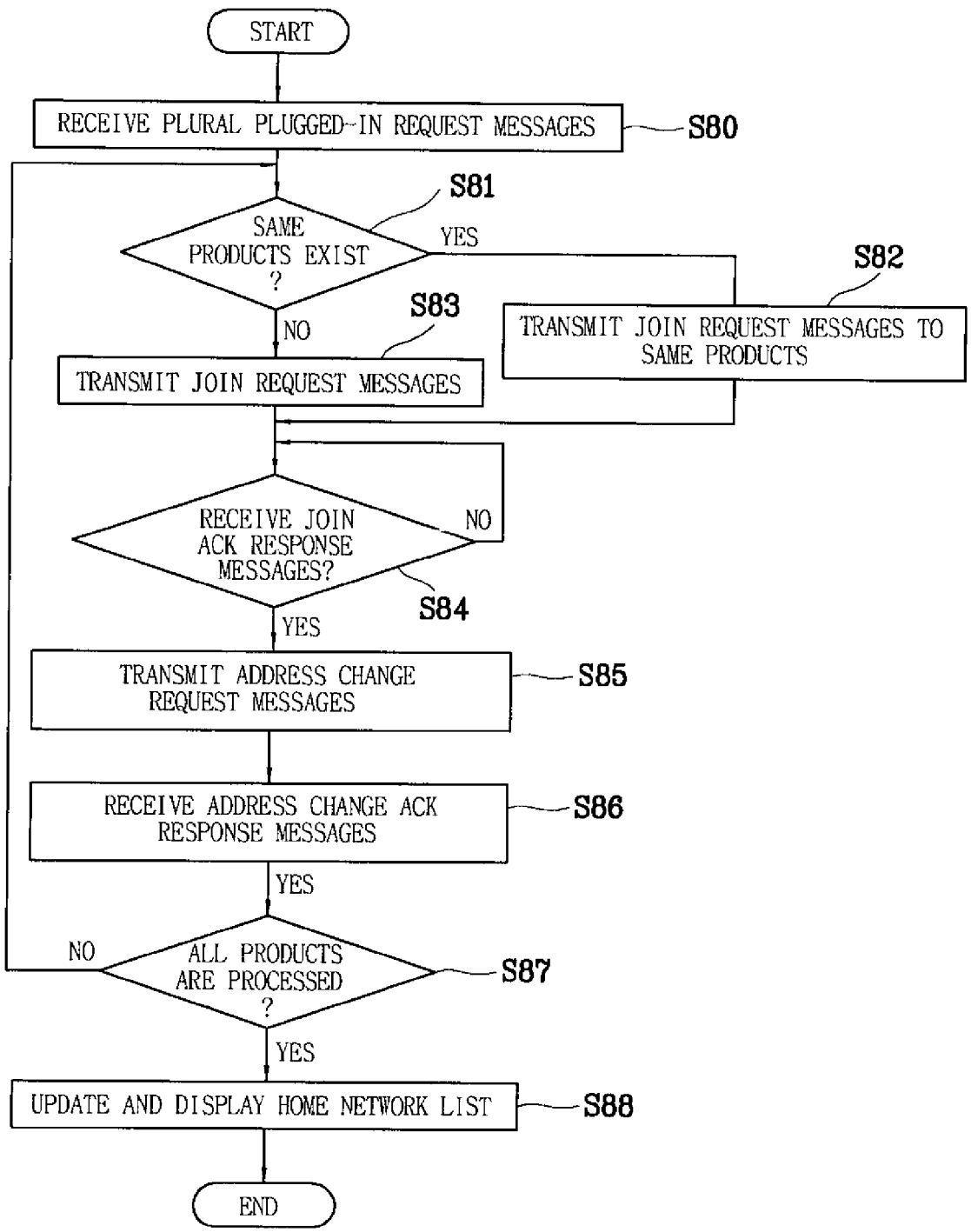
FIGS. 6B and 6C are flowcharts respectively showing second and third examples of the configuration method embodied in the master device of FIG. 2.
Figure 6C:
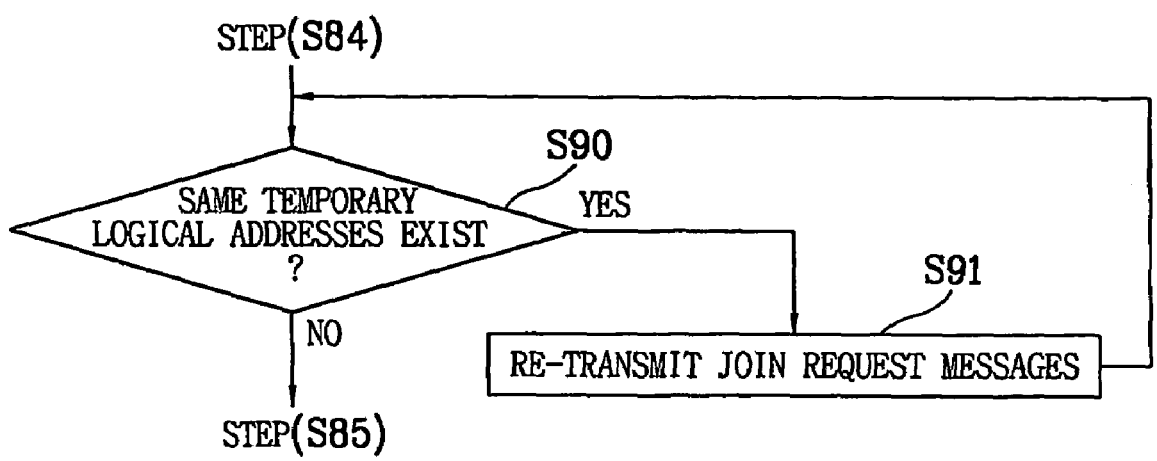

FIGS. 6B and 6C are flowcharts respectively showing second and third examples of the configuration method embodied in the master device of FIG. 2.

The configuration method of FIG. 6B includes a step (S80) for receiving, at the master device 30 of the home network system 1, a plugged-in request message from the new device 50, a step (S81) for deciding whether a plurality of new devices 50 which are same products exist, a step (S82) for transmitting join request messages to the same kind of product devices 50 when a plurality of new devices 50 which are same kind of products exist, a step (S83) for transmitting the join request messages to the product devices 50 when there is no same kind of product devices, a step (S84) for receiving join ACK response messages, a step (S85) for transmitting address change request messages to the new devices 50, a step (S86) for receiving address change ACK response messages from the new devices 50, a step (S87) for deciding whether the products have been all processed, and a step (S88) for updating and displaying a home network list according to the decision result.

In detail, S80 is similar to S60 of FIG. 5B, except that the plurality of plugged-in request messages are inputted at the same time or within a predetermined time.

In S81, the control means 38 decides whether the same kind of product devices 50 will be configured in the home network system 1 at the same time or within a predetermined time. For this, the control means 38 decides whether the same kind of product devices 50 are connected to the home network system 1 by analyzing product codes contained in the plurality of plugged-in request messages.

In S82, when there are same kind of product devices, the control means 38 transmits the join request messages containing initial addresses and temporary logical address ranges of the new devices 50 having the same product code. Accordingly, the new devices 50 storing different product codes from the product code of the initial address ignore the join request messages. The control means 38 processes the new devices 50 receiving the join request messages, and delays processing the other new devices 50 even if they continuously transmit the plugged-in request messages.

In S83, when there are no same kind of product devices, that is, all the product devices are different kind of products, the control means 38 transmits the join request messages containing the initial addresses and temporary logical address ranges of the new devices 50 to all the new devices 50.

In S84, the control means 38 receives the join ACK response messages containing the product codes and temporary logical addresses of the new devices 50 from the new devices 50.

In S85, the control means 38 sets and stores new logical addresses for the new devices 50 transmitting the join ACK response messages by searching information in the memory 34, and transmits the address change request messages containing the new logical addresses, product codes and temporary logical addresses to the new devices 50.

In S86, the control means 38 receives the address change ACK response messages containing the product codes and new logical addresses, and ends the configuration method for the new devices 50.

In S87, the control means 38 decides whether the new devices 50 have been processed. For this, the control means 38 confirms whether any of the new devices 50 has not received the join request message in S82. If such a device exists, the routine goes to S81 to start the configuration procedure.

In S88, when the new devices 50 have been all processed in S87, the control means 38 updates the home network list by registering the new devices 50, stores the home network list in the memory 34, and displays the updated list through the display means 36.

The configuration method further includes a step for receiving, at the master device 30, product information of the new device 50 from the new device 50, and storing the information in the memory 34.

The configuration method further includes a step which an area code of the new device 50 are automatically inputted by the master device 30 or manually by the user.

The configuration method further includes a step for changing option values for executing a predetermined operation between the master device 30 and the new device 50. The options can include an alive notification period in which the new device 50 transmits an alive event message to the master device 30. The master device 30 can change the alive notification period according to a communication status.

The third example of the configuration method of FIG. 6C is intended to solve the problems when the temporary logical addresses contained in the join ACK response messages from the plurality of new devices 50 in S84 of FIG. 6B are identical.

In S90, the control means 38 decides whether the join ACK response messages having the same temporary logical addresses exist. When the same temporary logical addresses exist, the control means 38 re-transmits join request messages containing temporary logical address ranges to the new devices 50 transmitting the same temporary logical addresses (S91). The routine goes to S85 to process the new devices 50 transmitting different temporary logical addresses. Here, the re-transmitted join request message includes the temporary logical address range, the product code and the same temporary logical address. Accordingly, the new devices 50 transmitting the join ACK response messages containing the same temporary logical addresses can receive the re-transmitted join request messages. In accordance with the third example of the present invention, even the same product devices 50 can have unique temporary logical addresses. The succeeding procedure of S85 of FIG. 6B is repeated.

Such configuration methods can be made in the form of a program, stored in a storage means of the master device and new device connected to the home network system, and executed when power is on.

FIGS. 7 to 12B are structure views illustrating messages transmitted in the third example of the configuration method in accordance with the present invention.

The following examples show real message structures processed by the master device 30, when the user connects four air conditioners 1 to 4, one refrigerator and one microwave oven to the home network system 1. That is, when the plurality of new devices 50 are connected, a plurality of plugged-in request messages are received as described in S80. The configuration apparatus 30a compares a product code (0x02) of the air conditioners, a product code (0x01) of the refrigerator and a product code (0x03) of the microwave oven in S80, and transmits join request messages to the configuration apparatuses 50a of the air conditioners 1 to 4 in S82.

FIG. 7 shows the join request message which the configuration apparatus 30 transmits to the configuration apparatuses 50a of the air conditioners 1 to 4. The join request message includes an initial address (0x0200) of the air conditioners 1 to 4 which are receivers, an address (0x0000) of the master device 30 (or network manager) which is a transmitter, a command code (0x0E) which notifies the join request message, and an argument (0x01, 0xFE) which is a temporary logical address range.

As described in S84, the configuration apparatuses 50a of the air conditioners 1 to 4 receiving the join request messages transmit the join ACK response messages containing temporary logical addresses 0x0A, 0x05, 0x03 and 0x05 to the configuration apparatus 30a.

FIGS. 8A to 8D show the join ACK response messages respectively transmitted from the configuration apparatuses 50a of the air conditioners 1 to 4. Here, a receiver is the master device 30, and transmitters have the same address, namely an initial address (0x0200) of the air conditioners 1 to 4. In addition, the join ACK response message contains a command code (0x0E) and a temporary logical address. Here, as mentioned in S73, the configuration apparatuses 50a of the air conditioners 1 to 4 change initial logical addresses of the initial addresses to the temporary logical addresses, and store the changed addresses.

In S90, the configuration apparatus 30a decides whether the temporary logical addresses contained in the join ACK response messages are identical, sets new logical addresses '0x01' and '0x02' for the air conditioners 3 and 1 having different temporary logical addresses as shown in FIGS. 9A and 9B, and transmits address change request messages containing the new logical addresses to the configuration apparatuses 50a of the air conditioners 3 and 1 (S85). Here, addresses of receivers are set by the configuration apparatuses 50a of the air conditioners 3 and 1, namely become the addresses '0x0202' and '0x020A' previously stored in the memory 54. Therefore, the address of the air conditioner 3 becomes '0x0201' and the address of the air conditioner 1 becomes '0x0202'.

FIG. 10 shows the join request message which the configuration apparatus 30a re-transmits to the configuration apparatuses 50a of the air conditioners 2 and 4 in S91. As shown in FIG. 10, an address of a receiver is '0x0205' which is the addresses of the air conditioners 2 and 4, a transmitter is the master device 30, and an argument is a temporary logical address range excluding the logical addresses set in the air conditioners 3 and 1.

FIGS. 11A and 11B show join ACK response messages transmitted from the configuration apparatuses 50a of the air conditioners 2 and 4. The configuration apparatuses 50a of the air conditioners 2 and 4 set temporary logical addresses '0x1D' and '0xF1', transmit join ACK response messages containing the temporary logical addresses, and store the temporary logical addresses in the memory 34 instead of the previous temporary logical address (0x05) (S73).

As shown in FIGS. 12A and 12B, the configuration apparatus 30a sets new logical addresses '0x03' and '0x04' for the air conditioners 2 and 4, and transmits address change request messages containing the new logical addresses to the configuration apparatuses 50a of the air conditioners 2 and 4 (S85). Here, addresses of receivers are set by the configuration apparatuses 50a of the air conditioners 2 and 4, namely become '0x021D' and '0x02F1' previously stored in the memory 54. Accordingly, the address of the air conditioner 2 becomes '0x0203' and the address of the air conditioner 4 becomes '0x0204'.

As described above, after the configuration method of the air conditioners 1 to 4 is finished, the configuration method of the refrigerator and the configuration method of the microwave oven are performed. As a result, the configuration methods of the new devices are all finished. The configuration methods of the refrigerator and the microwave oven are performed in the same manner as the configuration methods of the air conditioners 1 to 4.

FIG. 13 is a table showing one example of the home network list. As illustrated in FIG. 13, addresses of the new devices are set by the master device 30 (or network manager), and area codes are set by the master device 30 or the user according to areas, to form the home network list. The home network list includes status fields for receiving alive event messages from each slave device, and confirming operation statuses thereof.

The following Table 1 shows message protocols used by the home network system of the invention. As shown in Table 1, the message protocols include messages used by the new device firstly connected to the home network system, and messages used by the home network system (or master device).

TABLE 1

| Messages | Command code | Arguments | |
| --- | --- | --- | --- |
| | | Name | Type |
| Plugged-in request message | 0x1A | — | — |
| | Description: if logical address (device code) is 0x00, the device notifies this message periodically every 5 seconds. Otherwise, it doesn't notify the message anymore. | | |
| Join request message | 0x0E | Minimum value | Unsigned char |
| | | Maximum value | Unsigned char |
| | Description: master device requests a new device having logical address of 0x00 to join it to network with an arbitrary value as logical address in range of 'minimum value'-'maximum value'. | | |

TABLE 1-continued

| Messages | Command code | Arguments | |
|---|---|---|---|
| | | Name | Type |
| Join ACK response message | 0x0E | ACK | Unsigned char |
| | | Logical code | Unsigned char |
| | Description: when the new device receives join request message, if its logical address is 0x00, then it generates a random value within given range and adopt as temporary logical address, which means that the value is stored in RAM to clear after power off. | | |
| Address change request message | 0x0F | Logical code | Unsigned char |
| | | Area code | Unsigned char |
| | Description: master device can change the logical address of new device to arbitrary values in range of 0x00~0xFE. 0xFF is excluded since it means group address. | | |
| Address change ACK response message | 0x0F | ACK | Unsigned char |
| | Description: the new device sends a response message and charges it logical address to assigned values. | | |

Although the preferred embodiments of the present invention have been described, it is understood that the present invention should not be limited to these preferred embodiments but various changes and modifications can be made by one skilled in the art within the spirit and scope of the present invention as hereinafter claimed.

What is claimed is:

1. A network system, comprising:
at least one new device newly connected to a master device through a network, for transmitting a plugged-in request message containing an initial address through the network, receiving an address change request message containing a logical address, and changing the initial address to the logical address; and
at least one master device connected to the new device through the network, for receiving the plugged-in request message from the new device, setting the logical address for the new device, and transmitting the address change request message containing the logical address to the new device;
wherein when the master device receives a plurality of plugged-in request messages within a predetermined time, the master device decides whether the plugged-in request messages are inputted from the same kind of product devices before setting the logical address, transmits join request messages containing temporary logical address ranges to the same kind of new devices when there are the messages inputted from the same kind of product devices, or transmits the join request messages containing the temporary logical address ranges respectively to the new product devices when there is no message inputted from same kind of product devices,
wherein the new device sets an arbitrary value as a temporary logical address within the temporary logical address range, changes the logical address to the temporary logical address, and transmits a join ACK response message containing the temporary logical address to the master device,
wherein the master device decides whether the temporary logical addresses contained in the join ACK response messages are identical, re-transmits join request messages containing new temporary logical address ranges to the new devices transmitting the same temporary logical addresses, and transmits address change request messages containing new logical addresses to the other new devices,
wherein the initial address comprises at least a product code and a logical address of the new device, and the new device changes the logical address to the logical address set by the master device.

2. The system of claim 1, wherein the master device receives and stores product information of the new device.

3. The system of claim 1, wherein the master device sets an area code of the new device.

4. The system of claim 1, wherein the master device sets option values.

5. The system of claim 4, wherein the options comprise an alive notification period.

6. The system of claim 1, wherein the master device updates a network list by registering the new device.

7. The system of claim 6, wherein the master device displays the updated network list through a display.

8. The system of claim 1, wherein the new device transmits an address change ACK response message to the master device.

9. The system of claim 1 wherein the master device decides whether the logical address contained in the initial address of the new device is an initial logical address before setting the logical address, and sets the logical address when the logical address of the new device is identical to the initial logical address.

10. The system of claim 1, wherein the address change request message which the master device transmits to the new device comprises the temporary logical address and the logical address set by the master device.

11. The system of claim 1, wherein the new temporary logical addresses are not identical to the new logical addresses set in the other new devices.

12. A configuration method of a network system including at least one master device and new device, comprising the steps of:
transmitting, at the new device, a plugged-in request message containing an initial address of the new device to the master device;
setting, at the master device, a logical address for the new device;
transmitting, at the master device, an address change request message containing the logical address to the new device; and
changing, at the new device, the initial address to the logical address,
wherein deciding, at the master device, whether the plugged-in request messages are inputted from the same kind of product devices before the step for setting the logical address, when the master device receives a plurality of plugged-in request messages within a predetermined time;

when the messages are inputted from the same kind of product devices, transmitting, at the master device, join request messages containing temporary logical address ranges to the new devices, or when the messages are inputted from different kinds of devices, transmitting, at the master device, the join request messages containing the temporary logical address ranges respectively to the same kind of product devices;

setting, at the new device, an arbitrary value as a temporary logical address within the temporary logical address range;

changing, at the new device, the logical address to the temporary logical address;

transmitting, at the new device, a join ACK response message containing the temporary logical address to the master device;

deciding, at the master device, whether the temporary logical addresses contained in the join ACK response messages are identical;

re-transmitting, at the master device, join request messages containing new temporary logical address ranges to the new devices transmitting the same temporary logical addresses; and transmitting, at the master device, address change request messages containing new logical addresses to the other new devices, wherein the initial address comprises at least a product code and a logical address of the new device and the new device changes the logical address to the logical address set by the master device.

13. The method of claim 12, further comprising a step for setting, at the master device, an area code of the new device.

14. The method of claim 12, further comprising a step for setting option values.

15. The method of claim 12, further comprising a step for transmitting, at the new device, an address change ACK response message to the master device.

16. The method of claim 12, wherein the address change request message which the master device transmits to the new device comprises the temporary logical address and the logical address set by the master device.

17. The method of claim 12, wherein the new temporary logical addresses are not identical to the new logical addresses set in the other new devices.

18. A configuration method for configuring a new device in a network system, comprising the steps of:
  transmitting, at a new device, a plugged-in request message containing an initial address of the new device to the network system;
  receiving an address change request message from the network system; and
  changing the initial address to a logical address contained in the address change request message,
  wherein the initial address comprises a product code and an initial logical address of the new device,
  wherein the change step changes the initial logical address to a logical address set by the network system,
  wherein, further comprising the steps of:
  deciding whether a join request message containing the initial address and the temporary logical address range is inputted from the network system after transmitting the plugged-in request message;
  selecting an arbitrary value as a temporary logical address within the temporary logical address range according to the decision result;
  changing the initial logical address to the temporary logical address, and storing the changed address; and
  transmitting a join ACK response message containing the temporary logical address to the network system.

19. The method of claim 18, further comprising a step for transmitting an address change ACK response message to the network system after the change step.

20. The method of claim 18, wherein the address change request message comprises the temporary logical address and the logical address set by the network system, and the temporary logical address of the initial address of the new device is changed according to the logical address contained in the address change request message.

* * * * *